Feb. 18, 1947. P. J. McCULLOUGH 2,416,014
ELECTRIC TOASTER
Filed Jan. 25, 1943
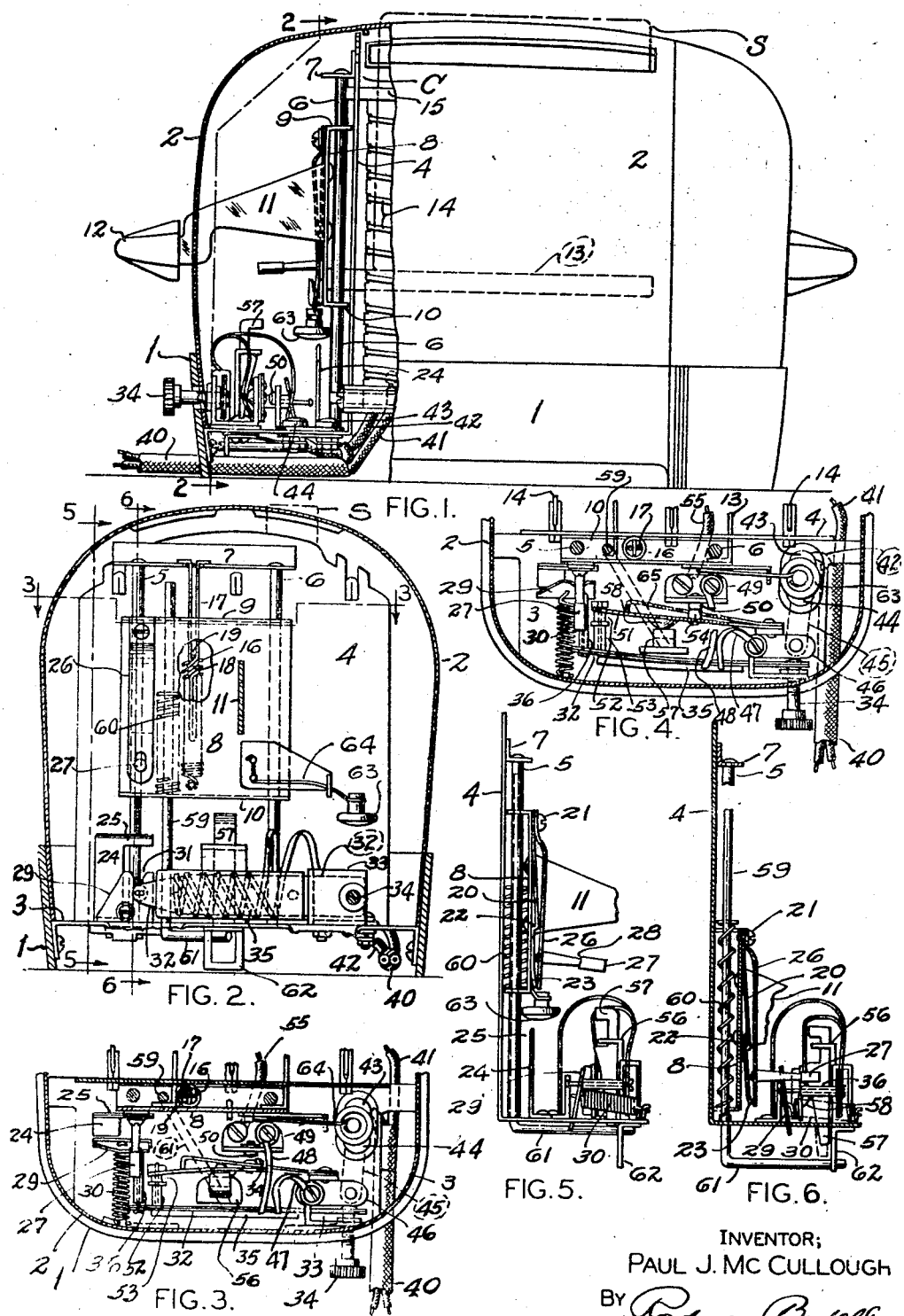
INVENTOR;
PAUL J. McCULLOUGH
BY Rodney Bedell
ATTORNEY Patented Feb. 18, 1947

2,416,014

UNITED STATES PATENT OFFICE 2,416,014

ELECTRIC TOASTER

Paul J. McCullough, St. Louis, Mo., assignor to Joseph Pavelka, St. Louis, Mo.

Application January 25, 1943, Serial No. 473,440

6 Claims. (Cl. 99—329)

1

The invention relates to electric toasters such as are in general domestic use and consists in all the novel features illustrated in the accompanying drawing and described below.

One object of the invention is to effect a fairly uniform output of toast by an automatic variation of the toasting period according to the latent heat in the toaster parts. Preferably this result is effected by controlling the toasting period by a thermostat.

Another object is to determine the toasting period by the action of a thermostat which is heated following the beginning of the toasting operation and, after being heated substantially, is cooled subsequently during the toasting operation, and, during its cooling, controls the time of the toasting operation. It is desired, however, to free the thermostat of work on external parts during its cooling.

Another object is to retain the toast within the toasting chamber after the completion of the toasting operation so as to keep the toast warm until it is wanted and, at the same time, to facilitate inspection and removal of the toast.

Another object is to quiet the operation of a toaster of the type in which the slice carrier is spring actuated to project the slice or part thereof at the end of a toasting operation.

These and other detail objects of the invention as will appear below are attained by the structure illustrated in the accompanying drawing, in which—

Figure 1 is in part a side elevation and in part a vertical longitudinal section through the body of a toaster showing the mechanism in side elevation. The parts are shown in their normal position when the toaster is not operating.

Figure 2 is a vertical transverse section through the body, taken approximately on the line 2—2 of Figure 1, and showing the mechanism in end elevation.

Figure 3 is a horizontal section taken approximately on the line 3—3 of Figure 2.

Figure 4 is a section corresponding to Figure 3 but showing the parts in a position assumed during the toasting operation and some of the parts being sectioned at different levels to more clearly illustrate the structure.

Figure 5 is a side elevation of the mechanism as viewed on the line 5—5 of Figure 2, i. e. from the side opposite to that shown in Figure 1.

Figure 6 is a similar sectional view but showing the parts in the position assumed during the toasting operation.

The toaster body includes a base 1, a casing 2, a bottom plate 3 and upright frames or partition plates 4, only one of which is shown. These parts may be formed and assembled in accordance with the disclosure in an earlier application by the present inventor filed December 26, 1942, Serial No. 470,191.

Vertical guide rods 5 and 6 are carried on bottom plate 3 and on a bracket 7 on the upper portion of plate 4. A carrier 8 has horizontal upper and lower flanges 9 and 10 apertured to receive rods 5 and 6, which rods mount the carrier for vertical sliding movement on the frame. An arm 11 extends from carrier 8 through a slot in casing 2 and mounts a handle 12 at its outer end whereby the carrier may be lowered and elevated manually. Slice support bars 13 extend horizontally from carrier 8 through slots in frame 4 and substantially throughout the length of the toasting chamber C.

Toasting heaters 14 of familiar type are carried on bars 15 mounted on frames 4. Normally, carrier 8 and the parts mounted thereon are supported in the positon illustrated in Figures 1, 2 and 5 by a coil spring 16, the lower end of which is secured to the lower portion of carrier 8. The upper end of the spring is connected to bracket 7 by a novel anchor member 17 which comprises a wire doubled on itself to form an elongated loop slidably received within the spring coils. Intermediate its ends, the legs of the loop are twisted to provide a bridge 18 between them adapted to engage the transverse hook 19, formed by the upper coil of the spring, which is slidable between the legs forming the upper portion of the loop.

When spring 16, and carrier 8, are suspended from bracket 7 by anchor 17, as indicated in Figure 2, the usual bread or toast slice S will barely project through the slot in the top of casing 2 and the major portion of the slice will be retained in the toasting chamber and kept warm by the latent heat of the toaster. If it is desired to inspect the toast, or to remove it, handle 12 may be lifted manually from the position shown in Figure 1 for a substantial distance, such movement being accommodated by the sliding of spring 16 upwardly on anchor 17 and by the sliding of flanges 9 and 10 upwardly on rods 5 and 6.

When the carrier 8 is moved downwardly manually, thereby stretching spring 16, and is thereafter released, the spring coils first move to solid position and then the entire spring slides upwardly along anchor 17 since the upper end of the spring is not held against upward movement. This relieves the spring and the parts to which it is secured from impact blows and makes it unnecessary to provide shock absorbing springs or other cushioning devices for checking the upward movement of the carrier. Also the elongated anchor prevents the spring from buckling transversely of its length when the carrier is released. This further tends to reduce noise and to prolong the life of the spring.

A vertically disposed elongated flat spring 20 has its upper end secured at 21 to carrier 8 and has an upwardly facing shoulder 22 (Figure 5) inclined downwardly and towards carrier 8 and spaced substantially below its upper end. Below shoulder 22 the spring has an outwardly flaring terminal 23. The lower end of the spring presses inwardly towards carrier 8.

A bracket 24 mounted upon bottom plate 3 has a lateral arm 25 in the path of movement of spring terminal 23 and the underside of this arm is frictionally engaged by shoulder 22 when carrier 8 is moved downwardly to the position shown in Figure 6, thus retaining the carrier in lowered position against the pull of spring 16, but because of the inclination of shoulder 22 the carrier may be readily lifted manually at any time. Preferably a flat spring 26 overlies spring 20, being secured at its upper end by screw 21 and bearing to the left (Figures 5 and 6) against the lower end 23 of spring 20. A pin 27 extends generally horizontally from the lower end of spring 26 but is loosely secured thereto so as to tilt to different positions. Pin 27 has a shoulder 28 facing inwardly towards spring 26. If desired, spring 20 may be made heavy enough to hold the carrier and latch engaged and spring 26 may be eliminated.

A clip 29 is pivotally mounted on bottom plate 3 and its upper end is pulled outwardly towards the front of the toaster by a coil spring 30. Clip 29 has an upwardly facing V-shaped notch 31 vertically aligned with pin 27. When carrier 8 is lowered, the larger diameter portion of pin 27 rests in notch 31. Clip 29 may be moved from the position shown in Figures 3 and 5 to the position shown in Figures 4 and 6 by the free end of a bi-metal thermostat 32 pivoted on a bracket 33 on bottom plate 3 and adjustably held at its right hand end by a screw 34 having a knurled head by which it may be turned readily by the user to produce dark or light toast as will appear below. Extending alongside of thermostat 32 is an electric resistance heater 35 which is energized when the toasting operation is begun by the downward movement of carrier 8 (as will be described later). When heated, the thermostat moves from the position shown in Figure 3 to the position shown in Figure 4 and a strut 36 on the free end of the thermostat engages clip 29 to thrust it inwardly, against the pull of spring 30, to the position shown in Figure 4, in which the smaller diameter portion of the pin rests in notch 31.

When the thermostat cools after movement to the position shown in Figure 4 and returns to the position shown in Figure 3, spring 30, released from the thermostat, pulls clip 29 to the position shown in Figures 3 and 5 and, in this movement, the sides of notch 31 engage shoulder 28 on pin 27, pulling the latter and spring 26 away from spring 20, whereupon spring 16 will overcome the resistance to the upward movement of carrier 8 by shoulder 22 on spring 20 and the carrier will return to the position shown in Figures 1, 2 and 5, thereby projecting the upper portion S of the slice slightly above the top of the toaster casing and affording a visual indication of the termination of the toasting operation.

The heating of the toasting heaters and of the thermostat is effected by the following circuit and switch structure: A cord 40, by which the toaster is connected to the house wiring circuit, will have any ordinary device at its outer end for plugging into a suitable outlet. One wire 41 of the cord is electrically connected directly to one terminal of the toasting heater 14. The other wire 42 of the cord is connected to one contact 43 of the main switch. The other contact 44 of the main switch is connected through bar 45 and bracket 46 to one end terminal 47 of the thermostat heater 35. The other terminal 48 of heater 35 is connected to a bracket 49 mounted on but insulated from bottom plate 3.

Bracket 49 is electrically connected by a wire 55 to the other terminal of toasting heater 14. Bracket 49 carries a contact 50 of a supplementary switch including an arm 51 for connecting brackets 46 and 49. Switch arm 51 is a spring blade fixed at one end to bracket 46 and extending generally parallel to thermostat 32.

When the thermostat is heated and moves inwardly from the position shown in Figure 3 towards the position shown in Figure 4, a strut pin 52 projecting from the free end of the thermostat and terminating in an insulation button 53 engages the free end of arm 51 to move the latter inwardly so that its contact 54 engages contact 50, and further inward movement of the thermostat and arm 51 will cause the latter to pivot about contact 50, increasing the resistance of the spring arm to distortion. An additional flat spring 65 cooperates with arm 51 to resist inward movement of the thermostat and to reopen the switch. Spring 65 is apertured to permit the projection therethrough of contact 54 (Figure 4).

Upon engagement of contacts 50 and 54, a substantial portion of the current flowing through heater 35 is shunted through arm 51, contacts 50 and 54 directly energizing toasting heater 14 thereby lowering the temperature of heater 35 and of the thermostat, and the latter straigtens slowly and moves outwardly towards the position shown in Figure 3 eventually permitting spring 30 to trip pin 27 and release carrier latch 22 as previously described.

It is desired to provide a lag between the first portion of the return movement of the thermostat and the opening of arm 51. To this end a bracket 56 on plate 3 mounts a gravity slide 57 having an inclined forward face opposing an insulation knob 58 on the outer face of arm 51. Normally, slide 57 is held in the elevated position shown in Figures 1, 2 and 5 by an L-shaped rod, the upright leg 59 of which is slidable through bottom plate 3 and flanges 9 and 10 of carrier 8 and is yieldingly supported on flange 10 by a spring 60 (Figure 2). The horizontal leg 61 of the rod extends beneath bottom plate 3 and the lower end of slide 57 into a slot in a bracket 62 depending from the bottom plate.

When carrier 8 is lowered manually, rod 59, 61 is moved from the position shown in Figure 5 to the position shown in Figure 6 and away from the lower end of slide 57 but the latter remains in its uppermost position because of the frictional contact between its inclined inner face and knob 58. As the thermostat 32, arm 51 and knob 58 move inwardly, slide 57 drops downwardly to the position indicated in broken lines in Figure 6 and acts as a wedge to hold arm 51 in the position shown in Figure 4 (irrespective of the early portion of the return movement of the thermostat) until carrier 8 is released, when upward movement of the latter and spring 60 lifts the rod leg 59 and the rod leg 61 lifts slide 57, thereby freeing knob 58, and switch 51 springs to open position.

When the carrier is moved downwardly manually, a button-like main switch element 63, pivotally and rotatably mounted on a spring 64 on carrier 8, connects contacts 43 and 44, and when the carrier is released and moves upwardly, this connection is broken. This switch structure is disclosed in detail in an earlier application filed by the present inventor January 8, 1943, Serial No. 471,688.

When the carrier is moved downwardly and the main switch is closed, it completes an initial common circuit leading through thermostat heater 35 to toasting heater 14. The resistance of heater 35 limits the amount of current delivered to the toasting heater. When the thermostat has moved to the position shown in Figure 4, the toasting heater receives additional current through the individual circuit closed by arm 51 and the toasting process is accelerated.

The shunting of a substantial portion of the current from heater 35 through the circuit closed by the supplementary switch results in a lowering of the temperature to which the thermostat is subjected, and the latter moves outwardly towards the position shown in Figure 3 far enough to effect the release of the carrier even though the thermostat, being subjected to a substantial amount of heat, does not move to the extreme position shown in Figure 3. If a second toasting operation is soon initiated by manual lowering of the carrier, the sequence of operations described above is repeated but, because of the latent heat in the thermostat and associated parts, it will not take so long a time for the thermostat to move inwardly to position to close the supplemenary switch, and accordingly the toasting operation will be shortened. The latent heat in the toaster body and heaters 14 will compensate for the shortened toasting period, thus providing uniform toasting of successive slices of bread. If the toaster remains unused for a sufficient length of time to permit all of the parts to cool to room temperature, then the next toasting operation will be lengthened accordingly.

The time required for the thermostat to move switch arm 51 to close the individual circuit for the toasting heater will vary with the initial angular position of the thermostat and this is readily controlled by manual rotation of screw 34.

Whenever the thermostat cools, it moves from a distorted position, assumed when heated, to a normal position free of pressure from other parts, and therefore it is readily responsive to a lowered temperature; and when the toasting operation is terminated, all the parts immediately resume their original position except as the setting for an ensuing toasting operation may be affected by the new position of the thermostat.

When the carrier is moved upwardly manually from the position shown in Figures 1 and 2, rod 59, 61 remains stationary, its spring 60 compressing as may be required to accommodate the upward movement of the carrier flange 10 which supports the spring and the toast slice may be projected a substantial distance above casing 2 to permit inspection or to facilitate its removal from the toaster.

If it is desired to inspect or remove the toast at any time during the toasting operation, this may be done by lifting handle 12 manually from the lowermost position indicated in Figure 6, through the position indicated in Figures 1, 2 and 5, to the elevated position referred to in the previous paragraph. If such manual lifting, and return, of the handle occurs during that toasting operation while the thermostat is still moving inwardly and before it has returned to the position in which elements 28 and 31 engage, the heater circuit will be broken and restored without any change in the timing mechanism.

The details of the structure may be varied substantially without departing from the spirit of the invention, and the exclusive use of those modifications of the invention coming within the scope of the claims is contemplated.

What is claimed is:

1. In a bread toaster, a body, a slice carrier, a spring support suspended from said body, a spring normally suspended at its upper end from said support but slidable thereon, said spring normally supporting the carrier in position in the body so that an ordinary slice thereon will be substantially enclosed within the body and an edge of the slice will be adjacent the wall of the body, the carrier being movable manually downwardly from said position to distort the spring and to retract the slice thereon from said position into a toasting position, and the carrier being movable manually upwardly to another position in which a substantial portion of the slice will be projected from the body to facilitate inspection and removal of the slice from the toaster, the spring being movable bodily with the carrier, and without distortion, during the latter-mentioned movement.

2. In a bread toaster including a slice carrier, a spring normally supporting the carrier in non-toasting position and a handle secured to the carrier for moving the latter manually in one direction against the thrust of the spring to another position for toasting a slice on the carrier, a friction latch engaging the carrier when so moved to hold it against return movement to non-toasting position by said supporting spring, said latch yielding to relatively light manual thrust in the opposite direction on said handle to free the carrier for return movement by its supporting spring, a spring normally disassociated with the latch, and a device actuated by increase of temperature in the toaster to connect the latter-mentioned spring to the latch and actuated by the latter-mentioned spring to release the latch when the temperature in the toaster is decreased.

3. In a bread toaster including a slice carrier, a spring normally supporting the carrier in non-toasting position, a handle secured to the carrier for moving the latter manually in one direction against the thrust of the spring to another position for toasting a slice on the carrier and a thermostat, a spring device on the carrier having a part movable laterally of the line of movement of the carrier and provided with an inclined shoulder facing in the opposite direction, a bracket on the body having an arm in the path of movement of said part and including an element facing in said direction and frictionally engaging said shoulder when the carrier is moved to toasting position to hold the carrier in toasting position against the thrust of its supporting spring, a spring actuated member, the thermostat operating when heated to move said member relative to the carrier spring device without affecting the same, said member and its spring operating, when the thermostat is cooled, to engage the carrier spring device and to free the shoulder and arm to release the carrier for return movement by its supporting spring.

4. In a bread toaster including a slice carrier movable from a normal non-toasting position to a toasting position, a support part and a coil spring having one end connected to the carrier, means supporting the other end of the spring from said part so that the spring tends to hold the carrier in said normal position, said means comprising an elongated member surrounded by the spring coils and over which the coils may slide and having one end projecting from the spring coils and connected to said support part, said member having an element spaced from its said end and arranged to engage the latter-mentioned end of the spring when the spring is stretched by the movement of the carrier to toasting position, the latter-mentioned end of the spring being movable bodily along the member away from said element when the carrier moves from toasting to non-toasting position.

5. In a bread toaster, a body, a slice carrier, and means yieldingly supporting the carrier in the body comprising an elongated, narrow member, secured at one end to the body and having a transversely extending element between its ends, and a coil spring telescopingly assembled with said member and having one end secured to the slice carrier, the other end of the spring being arranged to engage said element when the carrier secured end of the spring is moved in one direction away from the body secured end of the member and whereby the spring is stretched, a latch for temporarily holding the carrier in a spring-stretching position, the spring being movable bodily in the opposite direction toward the body secured end of the member when the latch is released.

6. In a bread toaster, a body, a slice carrier, a latch for temporarily holding the carrier in toasting position, and means yieldingly supporting the carrier in another position and comprising a pair of elongated, substantially parallel elements, closely adjacent to each other and secured at one end to the body and twisted together at a point spaced from said end, and a coil spring telescopingly assembled with said elements and having one end secured to the slice carrier, the other end of the spring having a cross element extending between said elements and engaging the twisted parts when the carrier is moved to engage said latch and the carrier secured end of the spring is moved away from the body secured end of the elements, whereby the spring is stretched, the spring being movable bodily in the opposite direction toward the body secured end of the elements when the latch is released.

PAUL J. McCULLOUGH.

REFERENCES CITED

The following references are of record in the file of this patent:

UNITED STATES PATENTS

| Number | Name | Date |
| --- | --- | --- |
| 2,001,362 | Ireland | May 14, 1935 |
| 2,176,940 | Young | Oct. 24, 1939 |
| 2,236,402 | Gomersall | Mar. 25, 1941 |
| 1,931,345 | Fitzgerald | Oct. 17, 1933 |
| 2,070,333 | Freeman | Feb. 9, 1937 |
| 1,623,093 | Chapin et al. | Apr. 5, 1927 |
| 2,241,103 | Uhlrig | May 6, 1941 |
| 2,141,867 | Ireland | Dec. 27, 1938 |
| 2,330,644 | Uhlrig | Sept. 28, 1943 |
| 2,196,393 | Ireland | Apr. 9, 1940 |
| 2,268,655 | Gomersall | Jan. 6, 1942 |
| 550,908 | Chevalie | Dec. 3, 1895 |